May 23, 1967 H. THIEL ET AL 3,321,679
ROLLED FOIL CAPACITOR HAVING HOLLOW LUG TERMINAL WITH
CONNECTING PIN THEREFOR
Filed Aug. 19, 1963 3 Sheets-Sheet 1

INVENTORS
HEINZ THIEL
CLAUS BACHMANN
BY
McGlew & Toren
ATTORNEYS

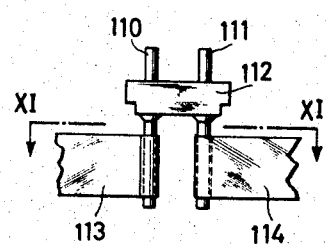
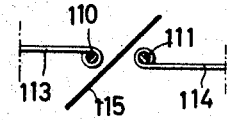
Fig. 10  Fig. 11
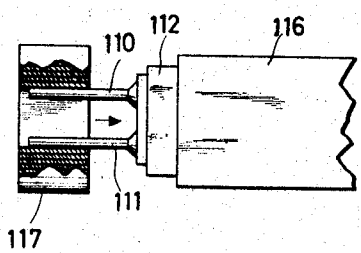
Fig. 12

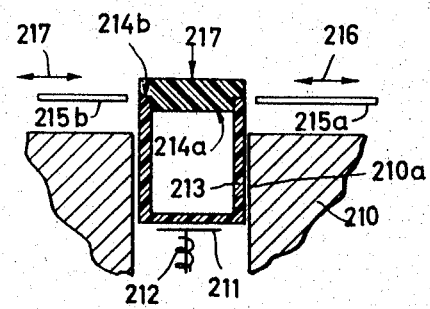
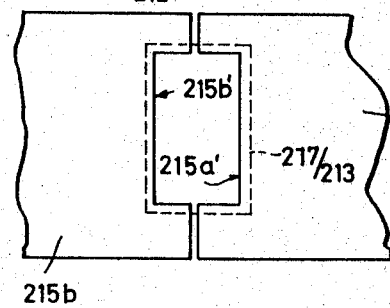
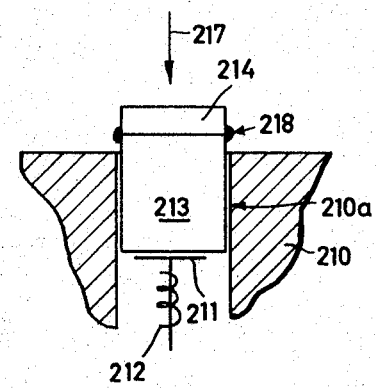

3,321,679
ROLLED FOIL CAPACITOR HAVING HOLLOW LUG TERMINAL WITH CONNECTING PIN THEREFOR
Heinz Thiel, Teningen, Baden, and Claus Bachmann, Freiburg im Breisgau, Germany, assignors to Messrs. Frako Kondensatoren- und Apparatebau Gesellschaft mit beschränkter Haftung, Teningen, Baden, Germany, a corporation of Germany
Filed Aug. 19, 1963, Ser. No. 302,847
Claims priority, application Germany, Aug. 24, 1962, F 37,671; Dec. 13, 1962, F 38,551; Dec. 22, 1962, F 38,651
7 Claims. (Cl. 317—230)

This invention relates in general to electrical condensers and to a method of making them, and in particular to a new and useful miniature electrolyte type condenser having predetermined defined dimensions, and to a process for the manufacture of such condensers.

The invention has particular application in respect to miniature electrolyte type condensers which are suitable for use with printed circuits. With condensers of this type it is necessary that the connecting or terminal pins must project from one side of the condenser and must have an exact predetermined spacing between them. For assembling such condensers in printed circuits, particularly in the modular technique, the condenser bearing surface should be as plane as possible and the overall dimensions have to be exactly in conformity with certain prescribed specifications. In addition, such a condenser must be simple in construction, and economical to make, and their production should be such that they can be manufactured automatically.

Miniature condensers of the electrolyte type are known wherein an anode-cathode coiled body is accommodated in a cup of synthetic material such as plastic. In some instances, connecting terminals or lugs project or exit from the coiled body end face which faces away from the cup bottom. With a construction of this nature it is usual to place the coiled body into the cup and to seal the cup by pouring a heat sealing material or the like over the cup opening.

The known condensers have the disadvantage that the synthetic resin forming the closure, particularly at high temperatures, does not afford a secure sealing of the cup, especially when it is filled with a liquid electrolyte. A further disadvantage is that it is not possible to form accurately the upper side or outer surface of the synthetic material which must serve a bearing surface in a completely planar manner. As a consequence, the height of the condenser will very often deviate from the specified or desired height. A further disadvantage of condensers of this type is that they cannot be made automatically, particularly in respect to the welding of the connecting pins to the connecting terminals or lugs. In addition, the production requirement for pouring the synthetic material as well as the exact measuring of the distance between the connecting pins, cannot be made automatically.

In accordance with the present invention, the condenser body is wound in a manner to provide two preformed bores or holes extending at precisely spaced locations. The ends of the condenser anode and cathode coils are formed as connecting pins or sleeves which are easily connected to connecting pins which may be inserted through the bores of the coiled body. The construction advantageously includes the embedding of the connector pins in a separate cover member and in precise alignment and spacing. The cover member forms the cover of a cup which receives the coiled body, and when the cover is positioned to close the cup, the projecting pins will engage the corresponding connecting elements or sleeves formed at the end of each anode and cathode coil. In a preferred arrangement the connecting pins are arranged in the holder of a mandrel element, and the coiled body of the condenser is formed by connecting the respective ends of the cathode and anode coils directly to the projecting pins and proceeding to wind the coiled body therearound in the precise spaced arrangement.

In a preferred arrangement, the connecting pins which on their interior ends may advantageously be a material such as aluminum, the portions which extend outwardly from the cover member may be in the form of smaller diameter copper pin elements. Advantageously, the interior portion of the connecting pin is connected to the exterior portion by a weld which is located to become embedded in the synthetic material which is formed therearound. In some instances the welding areas are additionally covered by means of an elastic element or sleeve.

In most instances the condenser is formed by separately forming the coiled body by winding it over two mandrels which are spaced from each other at a distance corresponding to the predetermined distance between the connecting pins, and thereafter forming the connecting pins in a separate synthetic material at the precise spacing required and then connecting the pins to the ends of the coils after they are removed from the mandrel. However, it is possible also to form the condenser coil by using connecting pins which also serve as mandrels about which the coiled body is formed. In this latter arrangement the anode and cathode ends of the coils are secured directly to the connecting pins and the coils are wound by using the pins as mandrel elements.

The entire condenser is assembled within a casing by securing a cover which contains the connecting pins to the casing by heat treatment, for example by high frequency welding or by connecting the cover to the casing by means of gluing. A preferred procedure, however, is to form a gas-tight seal by bringing the cover or lid to a closing position and by applying heat and inward pressure to the periphery of the casing at the location of the juncture to the closure lid to seal the lid to the casing.

In accordance with a further feature of the invention a device is provided for effecting the sealing of the closure lid to the cup or casing containing the condenser coil which includes means for clamping the casing in a position to permit two heated sheet metal tongues or lugs to be brought into engagement with the casing along the area in which it joins the cover. Inward pressure is applied to the tongues from opposite directions in order to cause welding or fusion of the cover and the casing together. In a preferred embodiment, the casing, after the cover is welded on and during the application of continuous downward pressure on the cover, is pressed through a die at which projections or beads from the welding seam are cut off. For this purpose the device is held in a die, the bottom of which forms a resilient ejection plate which ejects the casing after the downward pressure is removed. In some instances the casing is pressed downwardly by means of a plunger which moves downwardly on the cover to press it downwardly to an extent to cause cutting off of the welding bead by the edge of the die and during the return stroke of the plunger the ejection spring ejects the casing from the die.

It is an object of this invention to provide an improved condenser construction.

A further object of the invention is to provide an improved process of making a condenser, particularly of an electrolytic type.

A further object of the invention is to provide a miniature electrolyte condenser in a manner such that a secure sealing of the casing is assured and that the overall condenser structure has a plane bearing surface and that exact geometrical dimensions are maintained, with accurate spacing between the terminals.

A further object of the invention is to provide a method of forming a condenser in a manner such that it can be produced simply in automatic machinery and in which the individual process steps may be automatically formed.

A further object of the invention is to provide an improved condenser construction which includes a coiled body which is formed by connecting an anode and a cathode to respective terminal lugs which are held in precise spaced location and by winding the plate elements therearound in a manner to form openings for receiving connecting pins which are adapted to be inserted in the coil body and connected to the lug elements.

A further object of the invention is to provide an improved electrolyte condenser which includes an outer casing containing a coiled body with lugs projecting outwardly from one end thereof which is positioned within the casing and including a cover closing the casing which contains connecting pins which are precisely spaced and adapted to be fitted within the lug portions of the coil body.

A further object of the invention is to provide a method for manufacturing a condenser which is simple in concept and execution, and to provide an improved condenser which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 10 is a somewhat schematic partial elevational view indicating the manner of winding the condenser coiled body structure;

FIG. 11 is a section taken along the line XI—XI of FIG. 10;

FIG. 12 is a somewhat schematic side elevational view indicating a winding machine in position for effecting the winding of a coiled body around the connecting pins;

FIG. 13 is a somewhat schematic transverse sectional view of a machine for sealing the condenser casing;

FIG. 14 is a top plan view of the machine of FIG. 13 indicating the heating plates in an advanced position, the cover of the condenser casing being removed for clarity of illustration purposes; and FIG. 15 is a transverse sectional view of the machine indicated in FIG. 13 after the welding on of the cover and prior to removing the welding beads.

Figure 1:
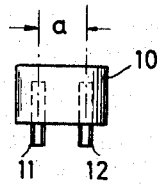
FIG. 1 is a side elevation of a coil body of a condenser constructed in accordance with the invention.
Figure 2:
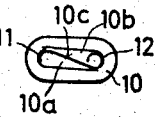
FIG. 2 is a bottom plan view of a coiled body of FIG. 1.

Referring to the drawings in particular, the invention embodied therein in FIGS. 1 and 2 indicates a coiled body or body portion of the condenser 10. The body portion 10 is composed in the customary manner of an anode foil, a cathode foil and a separator or spacer. From one end or side of the body 10 (as indicated, the lower end), there project connecting fins or lugs 11 and 12 which extend in parallel spaced relationship to each other. The body 10 is a flat coiled body with elliptical cross section and has a center opening which is formed during winding about the winding thorns or mandrels. The central opening also has an elliptical cross section, corresponding in respect to size and direction, to the distance between the two connecting fins 11 and 12.

As indicated in FIG. 2, the center opening formed in the coiled body 10, is divided between the two fins 11 and 12 by means of a separating wall 10c to form two congruent openings 10a and 10b. The anode and the cathode foil of the body 10 comprise, in accordance with the usual electrolyte condenser technique, pretreated, somewhat edged and shaped aluminum foils. The connecting fins or lugs 11 and 12 are also made of aluminum and are connected to the starting ends of the foils either by welding or riveting, or they may be formed thereon by cutting the associated foil to form an extending lug. Paper is used in a known manner as the spacing means in the coiled body. The separating means 10c comprises a nonconducting layer, and in the embodiment indicated it is formed by a correspondingly wound spacer or separator.

Figure 3:
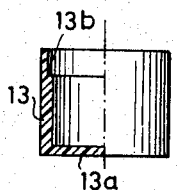
FIG. 3 is a partial elevational and partial sectional view of the condenser casing.
Figure 4:
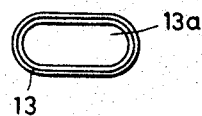
FIG. 4 is a plan view of the casing indicated in FIG, 3.

In FIGS. 3 and 4, there is indicated a cup-shaped housing or casing 13 having a bottom 13a. The casing consists of a non-conductive material, preferably a synthetic resin, and it is dimensioned so that it can accommodate the coiled body 10. The edge of the casing 10 is offset in order to form a bearing surface 13b for a cover or closure lid.

Figure 5:
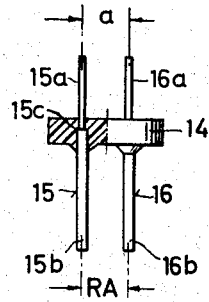
FIG. 5 is a partial elevational and partial sectional view of a cover with embedded connecting pins.
Figure 6:
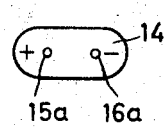
FIG. 6 is a top plan view of the cover indicated in FIG. 5.

A cover or closure lid 14 is indicated in FIGS. 5 and 6, and it is shaped to fit into the casing 13. The cover 14 is advantageously formed by molding a plastic material around two connecting pins 15 and 16 which are first oriented in spaced parallel relationship at a precise separating distance indicated a. This distance a is identical with the distance between the connecting fins 11 and 12 of FIG. 2.

The cover or lid 14 consists of insulating material, preferably synthetic material such as a resin. Each of the connecting pins 15 and 16 is formed of two parts 15a and 15b and 16a and 16b, respectively. The pin portions 15b and 16b which are designated for connection to the fins 11 and 12 consist of aluminum. The parts 15a and 16a which are intended for connection to the outer current terminals (not shown) are made of copper and may be tin-coated. The portions 15a and 16a are connected with the parts 15b and 16b at the areas 15c and 16c by welding or soldering. The length of the pin portions 15b and 16b corresponds to at least the height of the body 10.

Figure 7:
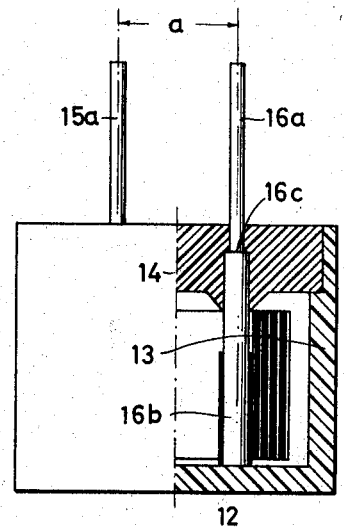
FIG. 7 is a partial side elevational and partial transverse sectional view of the complete condenser with the coiled body arranged in the casing.

In FIG. 7 there is indicated a condenser which is assembled from the individual components previously described. The cover 14 is arranged on the casing 13 and the pins 15 and 16 which are embedded in the cover are pushed through the openings 10a and 10b of the coiled body 10 which is accommodated within the casing 13. The ends of the pins 15 and 16 preferably are first welded or soldered with the connecting fins or lugs 11 and 12 which project from the end surface of the body. The projecting lug side is oriented to face the interior bottom wall of the casing 13. The cover 14 may advantageously be provided with an opening for filling the casing 13 with an impregnating electrolyte (not shown). The production of the miniature electrolyte condenser is accomplished, according to the invention, in such a manner that first the three semi-finished products, that is the coiled body 10, casing 13 and the cover 14 with the connecting pins 15 and 16, are separately produced and finally assembled together.

In order to produce the coiled body 10, two winding mandrels or thorns are employed which extend at the predetermined distance a parallel to each other and which are symmetrically arranged with regard to the winding axis. The mandrels (not shown) may be round or flat or polygonal. In order to produce flat bodies, flat mandrels are preferred, since these assure a good utilization of the space. The foils are introduced at the input or beginning of the body so that the anode fin is adjacent one of the mandrels while the cathode fin is adjacent the other mandrel. The spacer or separator is placed so that its first turn of the winding extends between the two mandrels and thus forms an insulating separating wall between the mandrels. After the termination of the winding, which is otherwise performed in the usual manner, the coiled or wound body is drawn off from the mandrels so that the connecting pins' receiving holes 10a and 10b are spaced corresponding to the desired distance a for connecting the connecting pins to the lugs 11 and 12.

The casing 13 is produced in a known manner, for example by injection molding, casting or pouring.

The cover 14 is produced according to a known injection or casting procedure. Prior to casting the cover 14, however, the two connecting pins 15 and 16 are inserted parallel to each other at the spacing a therebetween in the mold in such a manner that their connecting areas 16b and 16c are situated within that part of the mold which is to be filled with synthetic material. In order to obtain a particularly secure sealing of the connecting areas 15c and 16c, these areas may be covered prior to insertion in the mold with an elastic sleeve or envelope, for example of silicone rubber.

The cover 14 with the connecting pins 15 and 16, which pins are as thick as the winding mandrels, is now placed in the body 10 in such a manner that the pin portions 15b and 16b enter the holes 10a and 10b and the end portions, that is the portions which project from the lower side of the body, are then welded or soldered to the lugs 11 and 12 which also project from the same side of the body.

An alternate manner of forming the coiled body is indicated in FIGS. 10 to 12. In this embodiment the connecting pins which are now designated 110 and 111, serve as winding mandrels. As indicated in FIG. 10, the two connecting pins are shown embedded in a distance holding means 112 of synthetic material. This means 112 is constructed as a cover of a condenser casing (not shown).

The coiled body is formed by first welding an anode foil 113 and a cathode foil 114 to the respective pins 110 and 111. Between the two pins 110 and 111 there is placed a spacer foil 115. The cover 112 with the pins 110 and 111 is then mounted or tensioned in a head 116 of a usual winding machine. When the winding system is brought into rotation, the coiled body 117 is formed on the two pins 110 and 111. After the completion of the winding procedure, the unit consisting of the cover 112, the pins 110 and 111, and the body 117, is removed.

Since the connecting pins 110 and 111 must be as thin as possible in order to conserve space and must be made of a soft metal such as aluminum, for example, their ends are preferably supported by a counter bearing in the winding machine. In this manner the connecting pins are prevented from being bent during the winding operation. The counter bearing which supports the pins 110 and 111 during the winding procedure has to be rotated synchronously with the head 116 of the winding machine, and this, of course, can be easily accomplished by known means.

After the welding pins have been cut to the desired length and after impregnation of the body with an electrolytic liquid, the unit consisting of the body 117, cover 112 and pins 110 and 111, is inserted into the condenser cup or casing (not shown) and the cover is sealed to the cup, preferably by heat treatment such as by high frequency welding or by applying adhesive.

In FIGS. 13 to 15, there is indicated a method and apparatus for sealing of the condenser cup or casing 213 to a cover lid 214. A matrix or die 210 having a passage or bore 210a is closed downwardly by an ejector plate 211. The plate 211 is biased upwardly by a spring 212. The passage or bore 210a is of a dimension to exactly conform to the cross-section of the condenser casing 213 and its cover 214.

Above the die or matrix there is arranged laterally reciprocable heating plates 215a and 215b which are disposed parallel to the upper edge of the die 210. The plates 215a and 215b may be moved backwardly and forwardly in the direction of the arrows indicated 216 and 217. The plates 215a and 215b form heating tongues which are connected with a heating source (not shown) and their active edges 215a' and 215b' (FIG. 14) form together a rectangular opening which corresponds to the seam 214b between the cover 214 and the casing 213.

The cover 214 and the casing 213 are welded together by the tongues 215a and 215b which are advanced in a direction into engagement with the casing and cover automatically by means (not shown). The heating action causes a fusing together of the closing rim or cover 214 with the casing 213, and then the tongues 215a and 215b are automatically withdrawn. At the same time the cover 214 is strongly pressed downwardly onto the casing 213 by a reciprocating plunger (not shown) exerting a downward force 217 so that it is insured that the two elements are fused together in a gas-tight manner.

The downward pressure indicated by the arrow 217 on the lid 214 is continued, as indicated in FIG. 15, and the casing 213 which is welded at the seam of the cover 214, is then pressed downwardly into the die 210 until the projecting welded bead is cut off at the sharp die edge 210b. Thereafter the pressure 217 is removed from the cover 214 so that the ejection spring 212 ejects the workpiece from the bore 210a.

Figure 8:
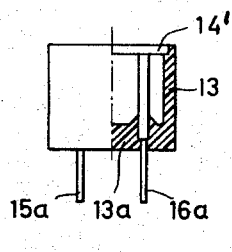
FIG. 8 is a partial elevational and partial sectional view of another embodiment of the casing, indicated on a reduced scale.
Figure 9:
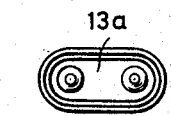
FIG. 9 is a top plan view of the casing indicated in FIG. 8.

A particularly intimate connection between the casing 213 and the cover 214 is obtained if the pressure 217 on the cover 214 is exerted by means of a plunger (not shown) which is driven by ultra-sonic means. If the casing 213 is provided with an impregnating opening, then the impregnation of the body with electrolyte can be accomplished after the condenser casing has been closed. The impregnating fluid opening is thereafter closed, and this may also be effected by heat-treatment, gluing, or in any suitable manner. In the event that the bottom of the casing is used as spacer means for a terminal connection (see FIGS. 8 and 9), then the production will be accomplished in basically the same manner as described above, but the pins 15a and 16a will project from the bottom of the casing and a flat cover 14' will be employed at the top.

All of the process steps which have been mentioned for producing the condenser may be automatically formed. This also applies for the connection of the connecting pins 11 and 12 with the associated anode and cathode foils, which have previously been done manually, because this contact area in the known condensers was not readily accessible. A subsequent bending or the like of the connecting pins to achieve the desired spacing therebetween is not necessary since the prefabricated individual portions have already been exactly manufactured to the desired dimensions.

The inventive condenser has excellent sealing characteristics and there is no likelihood for any electrolyte to leak out. The tightness is such that it will also resist high temperatures. The condenser also has a smooth bearing surface and has exactly defined geometrical dimensions with the distances between the terminal connections being exact. The condenser is inexpensive to manufacture, has excellent quality and can be mass produced.

While specific embodiments of the invention have been shown and described in detail to illustrate the application of the inventive principles, it will be understood that the invention may be embodied otherwise without departing from such principles.

What is claimed is:

1. An electrical condenser comprising first and second hollow lugs arranged in predetermined spaced relationship, an anode foil connected to said first lug, a cathode foil connected to said second lug, a dielectric material web separating said lugs and disposed between said anode foil and said cathode foil, said web and said cathode foil being wound around the exterior of said lugs into a coil, said lugs each having an end projecting outwardly from a first common side of said coil, said coil having an opposite second side opening into the interior with said lugs therein, and a connecting pin for each lug extending into the coil opening from the second side and each connected to a respective lug adjacent the portion of the lug which projects outwardly from the first side of said coil.

2. An electric condenser according to claim 1, including a cover member, said connecting pins being formed within said cover member and held by said cover member in parallel spaced relationship at the same spacing as the spacing between said connecting lugs.

3. A condenser according to claim 1, including distance maintaining means in which said connecting pins are embedded.

4. A condenser according to claim 3, wherein said distance maintaining means is constructed in the form of a cover for said condenser casing and is made of synthetic material.

5. A condenser according to claim 1, including distance maintaining means in which said connecting pins are embedded, said means forming the bottom of said condenser casing.

6. A condenser according to claim 1, wherein said condenser connecting pins are of copper material at one end and valve metal at the opposite end, said ends being connected together by welding, and distance maintaining means in which said connecting pins are embedded, said distance maintaining means surrounding the welded areas.

7. A condenser according to claim 1, wherein said connecting pins are made of different metallic materials which are welded together, and an elastic material surrounding said connecting pin in the area of the weld.

References Cited by the Examiner
UNITED STATES PATENTS

| | | | |
|---|---|---|---|
| 239,370 | 3/1881 | De Forest | 317—260 |
| 1,871,269 | 8/1932 | Hobrock | 317—230 |
| 2,033,309 | 3/1936 | Siegmund | 317—230 |
| 2,225,801 | 12/1940 | Schnoll | 317—230 |
| 2,321,997 | 6/1943 | Compton | 317—230 |
| 2,393,966 | 2/1946 | Breannan | 317—230 |
| 2,464,022 | 3/1949 | Carpenter | 317—230 |
| 2,884,575 | 4/1959 | Lilienfeld | 317—230 |
| 2,987,800 | 6/1961 | Kurland et al. | 29—25.31 |
| 3,040,376 | 6/1962 | Elphee | 264—161 |
| 3,120,695 | 2/1964 | Burnham | 29—25.31 |
| 3,153,180 | 10/1964 | Bellmore | 317—260 |
| 3,156,749 | 11/1964 | Hosfield | 264—161 |

JAMES D. KALLAM, *Primary Examiner.*